3,300,467
PRODUCTION OF CRYSTALLINE ISOTACTIC CIS-1,4-POLYPENTADIENE WITH A Ti(OR)$_4$-AlR$_3$ CATALYST
Giulio Natta, Lido Porri, Gianfranco Stoppa, and Antonio Carbonaro, Milan, Italy, assignors to Montecatini Edison S.p.A., Milan, Italy
Filed Feb. 11, 1963, Ser. No. 257,665
Claims priority, application Italy, Feb. 12, 1962, 2,683/62, 22,654/62
10 Claims. (Cl. 260—94.3)

The present invention relates to certain novel polymers of 1,3-pentadiene and to a simple and effective process for preparing these polymers.

In our copending U.S. application 193,528, filed May 9, 1962, there is described crystalline 1,3-pentadiene polymers having a cis-1,4 enchainment of the monomeric units and a syndyotactic configuration of the asymmetric carbon atoms. These polymers have an identity period, along the direction of the main chain, of about 8.5 A. Moreover, in the crystalline state, the infrared spectrum of these polymers shows the presence of characteristic bands which are absent from the spectrum of the molten polymer or from the spectrum of the same polymer in solution. The most intense of these bands are at 11.67μ, 10.8μ, 10μ and 8.85μ.

We have now surprisingly obtained from 1,3-pentadiene certain new crystalline polymers having a prevailingly cis-1,4 enchainment as is the case with the above mentioned polymers. In contrast to the polymers of our copending application however, the present novel polymers possess an isotactic configuration of the asymmetric carbon atoms.

Figure 1:
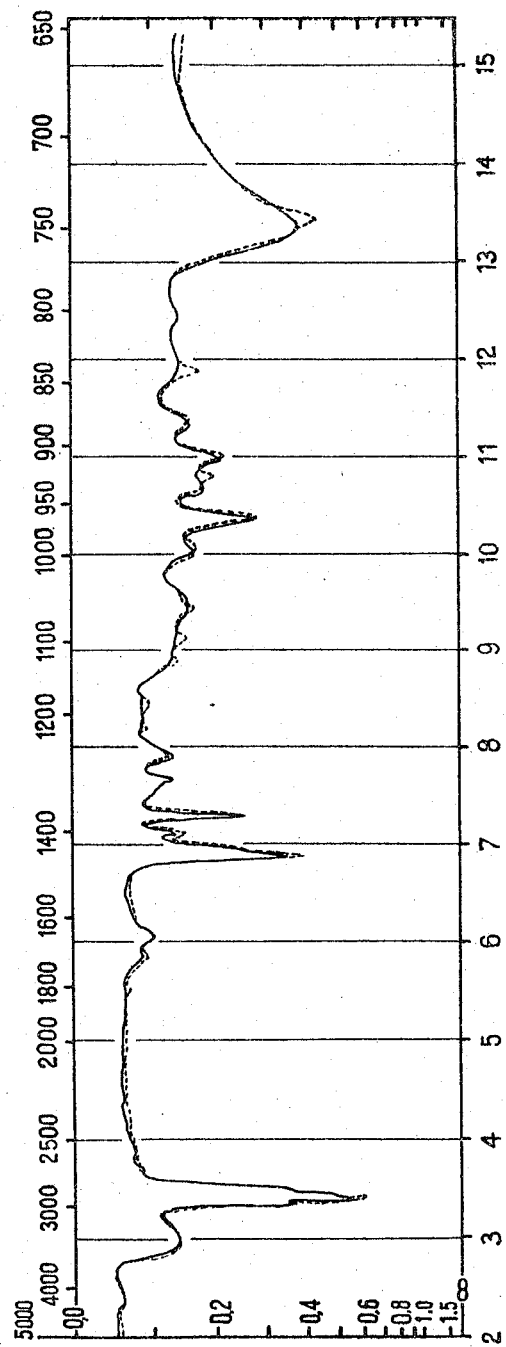
Figure 2:
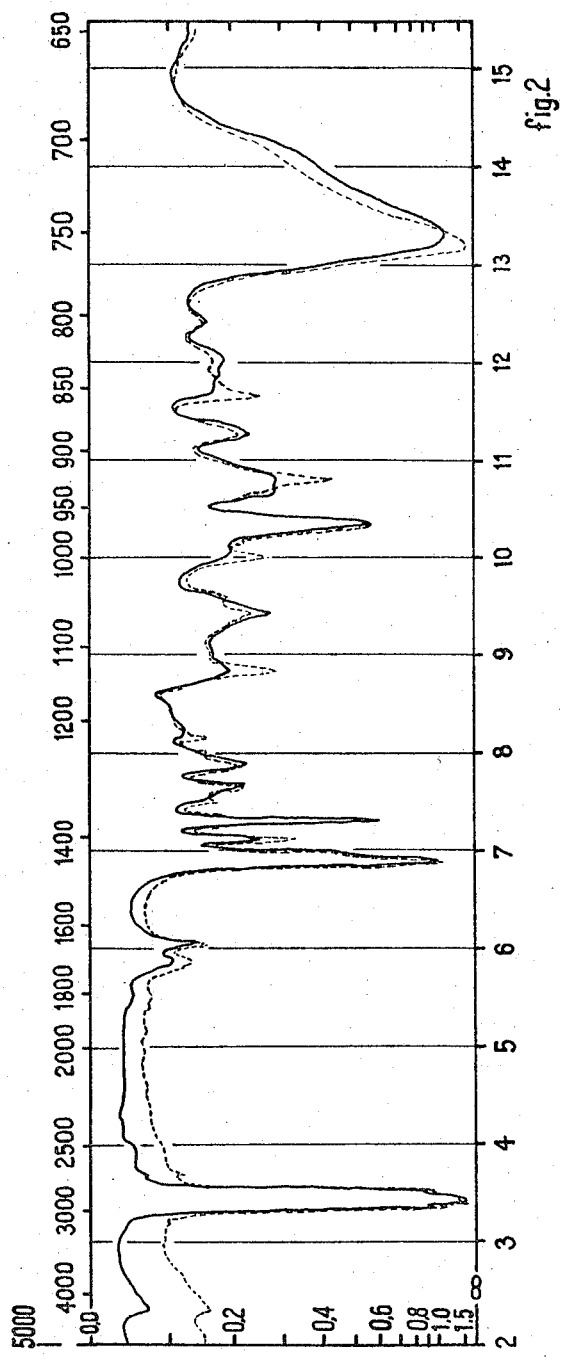

FIGURES 1 and 2 are representations of the infrared spectrum of polypentadienes possessing an isotatic configuration of the tertiary carbon atoms and a syndyotactic configuration of the tertiary carbon atoms respectively. In FIGURES 1 and 2 the absorbance values are shown on the ordinate, while the wave lengths in microns are given as the upper scale on the abscissa and the frequency in cm.$^{-1}$ is the lower scale thereon. In each of these two figures solid lines indicate the spectrum of the polypentadiene in solution or in the molten state, whereas the dotted lines show the spectrum of the polymer in the crystalline state.

Figure 3:
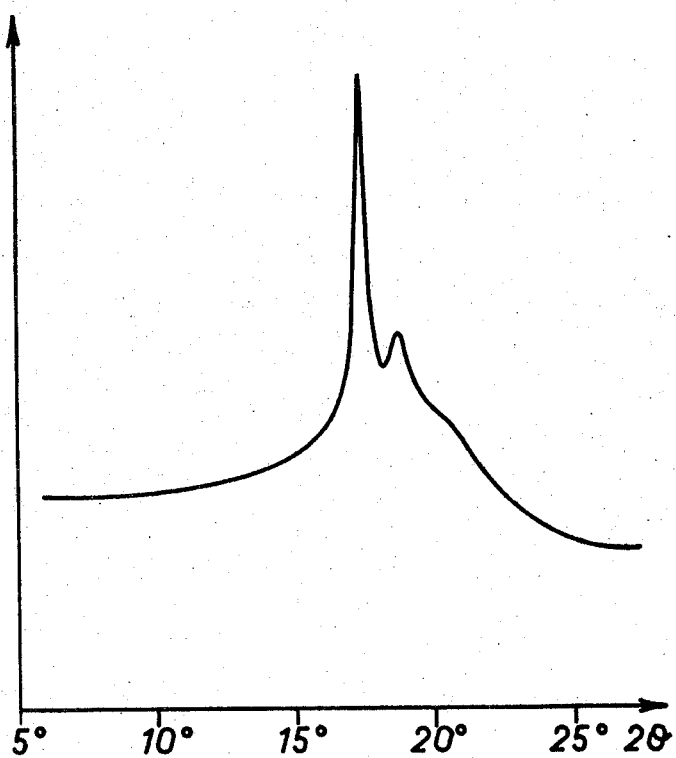

FIGURE 3 shows the X-ray spectrum, registered with a Geiger counter, of a polypentadiene of the present invention. The relative intensities are shown on the ordinate and the diffraction angles (2θ) are plotted on the abscissa.

It is therefore an object of the present invention to provide certain novel cis-1,4 polymers of 1,3-pentadiene possessing the isotactic structure.

Another object is to provide a process for preparing these polymers.

Further objects of the present invention and some advantages thereof will become hereinafter apparent.

The differences between the polymers of the present invention and known cis-1,4-polypentadiene are shown by the data obtained upon X-ray and infrared examination of the polymers.

The fiber spectrum of the present polymers indicate the presence of an identity period of about 8.1 A, which value could only indicate a cis-1,4 isotactic structure; the identity period of the polymer possessing the syndyotactic structure (as reported in U.S. Serial No. 193,528), being about 8.5 A.

Other significant differences are observed in the fiber spectrum of these two polymers, which differences relate not only to the position of the diffraction spots but also to the state of the intensity diffracted onto the first two layers.

In the spectrum of the syndyotactic polymer, the total intensity diffracted onto the 2nd layer is higher than that diffracted on the 1st layer; while in the spectrum of the instant novel polymers the opposite is observed. This is a further demonstration of the presence of the cis-1,4 isotactic structure in these new polymers.

The X-ray spectrum, registered with a Geiger counter, of our new polymer as shown in FIGURE 3, wherein the relative intensity is plotted on the ordinate and the diffraction angles 2θ (CuKα) on the abscissa, presents two peaks corresponding to diffraction angles 2θ=17° and 2θ=18.8° and appears to be different from that of the corresponding syndyotactic polymer due to the different ratios between the intensities of these two peaks.

The infrared spectrum of our new polymer, in the molten state or in solution (FIGURE 1, continuous line) differs only slightly from the spectrum of the cis-1,4-polypentadiene exhibiting a syndyotactic structure (FIGURE 2, continuous line). Like the spectrum of the latter, it presents an intense band in the zone around 13.3μ, which is characteristic of inner double bonds of the cis type.

Remarkable differences are, however, noted in the spectrum of the two polymers in the crystalline state. In the spectrum of polymer containing the isotactic structure (FIGURE 1, dotted line) there are present bands which are not present in the spectrum of the dissolved polymer or melted polymer, the most intense of which are at 11.88μ, 10.8μ, 9.95μ, 9.12μ, and 8.87μ.

The position of these bands therefore is generally different from that of the bands exhibited by the polymer containing the syndyotactic structure (FIGURE 2, dotted line).

A particularly good criterion for differentiating the two polymers on the basis of their infrared spectrum in the crystalline state is the position of the band representing the inner double bonds of cis type. In the case of the syndyotactic polymer this band is at about 13.2μ, while in case of the isotactic polymer the band is at about 13.4μ.

The crystalline 1,3-pentadiene polymers having the isotactic cis-1,4 structure of the present invention are obtained with catalysts prepared by reacting aluminum alkyls with titanium alkoxides.

These catalysts, when used with butadiene and diolefins of the formula, CH=CH—CR=CH$_2$ (wherein R is an alkyl) such as, e.g., isoprene, give polymers having a 1,2-enchainment as shown in Italian Patent No. 538,453. Therefore it could not be predicted that the same catalysts would, when employed with 1,3-pentadiene, give polymers having the cis-1,4 isotactic structure.

In preparing the catalyst according to the present invention any organic aluminum compound having the general formula:

wherein R$_2$ and R$_3$ may be the same or different alkyl, alkylaryl or cycloalkyl groups containing 1 to 15 carbon atoms and R$_1$ can be a hydrogen atom or an alkyl, alkylaryl or cycloalkyl group containing 1 to 15 carbon atoms, may be used.

Some examples of suitable organoaluminum compounds include: dimethyl aluminum monohydride, diethyl aluminum monohydride, diisopropyl aluminum monohydride, dibutyl aluminum monohydride, dihexyl aluminum monohydride, dioctyl aluminum monohydride, ethyl isobutyl aluminum monohydride, ethyl propyl aluminum monohydride, ethyl hexyl aluminum monohydride, aluminum triethyl, aluminum triisobutyl, aluminum tridodecyl, aluminum tricyclohexyl, aluminum diethylmonobenzyl, etc.

Mixtures of a dialkylaluminum monohydride with an aluminum trialkyl in any ratio can also be used.

Suitable titanium compounds comprise any compound of the formula, Ti(OR)$_4$, wherein R is an alkyl, aryl, alkylaryl or cycloalkyl group, containing 1 to 10 carbon atoms.

Some examples of suitable titanium compounds include: titanium tetra-n-butoxide, titanium tetraisopropoxide, titanium tetraphenolate, and titanium tetraethoxide.

The preparation of the polymerization catalyst is preferably carried out in an aliphatic or aromatic hydrocarbon solvent by simply mixing the two reactants together, preferably at room temperature.

The Al/Ti ratio can vary within very wide limits, e.g., between about 1:1 and 100:1, preferably between 3:1 and 15:1.

The temperature range suitable for the polymerization is very wide. Thus, the polymerization can be conducted at temperatures between about $-100°$ and $+100°$ C., preferably between $-50$ and $+50°$ C.

As the polymerization solvent or diluent, any aromatic or aliphatic hydrocarbon can be used.

If desired, it is also possible to operate in absence of extraneous solvents by using an excess of the liquid monomer as the solvent.

The cis-1,4-polypentadienes obtained with the catalysts prepared from aluminum alkyls and titanium tetraalkoxides possess a melting point of 40–45° C., which is slightly higher than that of natural rubber. This property renders these polymers particularly suitable for the use in the field of elastomers.

By vulcanization of the cis-1,4-polypentadiene of the present invention, according to known methods, it is possible to obtain vulcanized products which are amorphous at room temperature in the unstretched state, but which are crystalline in the stretched state. These vulcanized products are characterized by a low initial modulus and a high tensile strength. Moreover, owing to the particular configuration of the chains due to the cis-1,4 enchainment, these polymers exhibit a high rebound elasticity, comparable with that of natural rubber.

Cis-1,4-polypentadienes possessing the isotactic structure and obtained by the process of the present invention usually have a rather high molecular weight, e.g., intrinsic viscosities [$\eta$] of about 6 to 7 (100 cc./g.) determined in toluene at 30° C.

The cis-1,4-polypentadienes containing the isotactic configuration are, however, easily degraded during processing in the mixer. Therefore the direct production of a high molecular weight polymer in the polymerization does not present a drawback. In this regard, cis-1,4-polypentadiene exhibits a behaviour similar to that of natural rubber and different from that of cis-1,4-polybutadiene which, as is known, does not undergo degradation in the mixer, and must therefore be directly obtained with the desired molecular weight by polymerization.

The vulcanized products, obtained from cis-1,4-polypentadiene possessing an isotactic structure, also possess a higher tear strength than the vulcanized products obtained from cis-1,4-polybutadiene.

The crude polymerization products obtained with catalytic system comprising AlR$_1$R$_2$R$_3$ and Ti(OR)$_4$, in general, have a cis-1,4 unit content of about 60–70% (determined by the analytical method described hereinbelow).

Polymers with a higher content of cis-1,4 units can be obtained by removing the macromolecules having a lower cis-1,4 content from the polymerization product. This can be achieved, for example, by using the method described in our copending U.S. Serial No. 193,528, i.e., by dissolving the polymer in benzene or in another suitable solvent (e.g., ethylether, ethylacetate, etc.) and then reprecipitating it with methyl ethyl ketone. By following this technique the less sterically less pure macromolecules, which are more soluble because of their lower tendency to crystallize, remain in solution.

By repeating the solution and reprecipitation operations two or three times it is possible to obtain polymers having a content of cis-1,4 units of about 85–90%. For most uses, however, such as wherein the polymers are used as elastomers, the purification of the product is not necessary.

INFRARED ANALYSIS OF CIS-1,4-POLYPENTADIENE

The polymer is examined in a carbon disulphide solution. The trans type unsaturation is determined from the optical density of the band at 10.35$\mu$, and the unsaturation of the vinyl type is determined from the optical density of the band at 11$\mu$, while assuming that the absorption coefficients for the two bands are $10 \times 10^4$ cm.$^{-1}$ x mols$^{-1}$ x ml. and $12 \times 10^4$ x cm.$^{-1}$ x mols$^{-1}$ x ml. respectively, which are the average values reported in the literature (see A. L. McMurray and V. Thornton, Anal. Chem. 24, 318 (1952)).

The optical density of the band at 10.35$\mu$ is read with respect to a base line drawn between 10.08$\mu$ and 10.55$\mu$. That of the band at 11$\mu$ is read with respect to a base line drawn between 10.8$\mu$ and 11.2$\mu$.

The percentage of unsaturation of trans type is calculated according to the formula $$C_t\% = \frac{D_{10.35} \times 6.8 \times 10^2}{S \times P}$$

that of vinyl type with the formula:

$$C_{vin}\% = \frac{D_{11} \times 5.7 \times 10^2}{S \times P}$$

wherein $S$=thickness of the cell in cm.
$P$=mg. of polymer dissolved in 10 ml. of carbon disulphide.

The percent unsaturation of the cis-1,4 type is calculated by the formula:

$$C_{cis}\% = 100 - (C_t\% + C_{vin}\%)$$

The following examples are given to illustrate some specific embodiments of the present invention without limiting the scope thereof.

All parts and proportions are by weight unless otherwise indicated.

*Example 1*

A polymerization is carried out in a 100 cc. glass test tube. In to this test tube, after the removal of air therefrom and the introduction of anhydrous N$_2$, the following substances are introduced while operating without any contact with air:

|  | Cc. |
|---|---|
| Anhydrous benzene | 80 |
| Titanium tetra-n-butoxide | 0.6 |
| Aluminum triethyl | 1.8 |

The temperature is brought to 0° C. and 15 cc. of 1,3-pentadiene (99% of trans isomer) are added to the homogenized mixture. The monomer is added 2 to 4 minutes after the formation of the catalyst. The whole mass is then kept at 0° C. for 18 hours and the polymerization is stopped by the addition of methanol. The polymer is coagulated by the addition of an excess of methanol and is then dried under vacuum.

3 g. of a solid crystalline polymer possessing the isotatic structure are obtained. This polymer upon infrared analysis is shown to consist of:

71% of double bonds of cis type
8% of double bonds of vinyl type
21% of double bonds of trans type The polymer is dissolved in benzene, reprecipitated with methyl ethyl ketone and then subjected again to infrared analysis. This polymer is shown to contain:

78% double bonds of cis-type
17% double bonds of trans type
5% double bonds of vinyl type After a further purification by dissolution in benzene and reprecipitation with methylethyl ketone, the polymer is shown to exhibit the following characteristics:

(a) Infrared analysis:

85% of double bonds of cis type
12% of double bonds of trans type
3% of double bonds of vinyl type (b) The polymer is shown to be crystalline by X-ray examination at room temperature. The X-ray spectrum thereof, registered with a Geiger counter, is reported in FIGURE 3;

(c) Intrinsic viscosity, determined in toluene at 30° C.=7.04 (100 cc./g.);

(d) Melting temperature (under the polarizing microscope)=43° C.

Example 2

The polymerization is carried out as in Example 1, but by operating at +20° C. instead of at 0° C.

After 5 hours, 4.2 g. of crystalline polymer are obtained which by infrared analysis is demonstrated to consist of:

66% of cis double bonds
25% of trans double bonds
9% of vinyl double bonds

After purification by means of two dissolutions and reprecipitations with methyl ethylketone as described in Example 1, the polymer exhibits a cis-1,4 unit content of about 85%, possesses an isotactic structure, and is crystalline under X-ray examination.

Example 3

The polymerization is carried out in the manner of Example 1, but using toluene instead of benzene and operating at −20° C. instead of 0° C.

After 60 hours, 3 g. of crystalline polymer having a cis-1,4 unit content of about 71% and the isotactic structure are obtained.

After purification by repeated dissolution and reprecipitation, a product having a cis-1,4 unit content of 86% is obtained.

Example 4

The polymerization is conducted as described in Example 1, using the following reactants:

| | Cc. |
|---|---|
| Anhydrous benzene | 80 |
| Titanium tetraisopropylate | 0.6 |
| Al(C$_2$H$_5$)$_3$ | 1.6 |
| Pentadiene (95% trans) | 15 |

After polymerization at 0° C. for 24 hours and coagulation with methanol, a product having a cis-1,4 unit content of 69% and a crystallinity derived from the isotactic structure (as shown by X-ray examination) is obtained. The rate of conversion is 45%.

After purification by dissolution in benzene and reprecipitation with methyl ethyl ketone, a product containing 87% of units with cis-1,4 enchainment and having an intrinsic viscosity of 5.84 (100 cc./g.) (determined in toluene at 30° C.) is obtained.

Example 5

In this polymerization run there is employed 40 cc. of anhydrous n-heptane, in which the following substances are dissolved at 0° C. in the sequence:

| | Cc. |
|---|---|
| Titanium tetra-n-butoxide | 0.3 |
| Al(C$_2$H$_5$)$_3$ | 0.9 |
| Pentadiene (95% of trans) | 6.0 |

The polymerization is carried out at 0° C. for 2 days. 3 g. of slightly crystalline polypentadiene, possessing the isotactic structure and having the following composition are obtained:

52% of cis-1,4 units
36% of trans units
12% of vinyl units

Example 6

This polymerization is carried out by using the pentadiene as the solvent.

0.2 cc. of Al(C$_2$H$_3$)$_5$ and 0.005 cc. of titanium tetraisopropoxide are dissolved in 10 cc. of pentadiene (96% of trans isomer). After 2 days, the polymerization is stopped by adding methanol thereto. 0.3 g. of a dry polymer with a cis-1,4 unit content of 50% and possessing the isotactic structure are obtained.

Example 7

By operating as described in Example 1, a polymerization is carried out using the following ingredients:

| | Cc. |
|---|---|
| Toluene | 30 |
| Aluminum triisobutyl | 0.6 |
| Ti tetra n-butoxide | 0.2 |
| Pentadiene | 4.0 |

The polymerization is carried out at 0° C. and is stopped after 40 hours by the addition of methanol.

1.9 g. of polypentadiene having a cis-1,4 unit content of 66% and the isotactic structure are obtained. After a purification step as shown in Example 1, a product containing 82% of cis-1,4 units is obtained.

Example 8

Using the pure cis isomer of pentadiene, the polymerization is carried out with the following ingredients:

| | Cc. |
|---|---|
| Anhydrous benzene | 25 |
| Al(C$_2$H$_5$)$_3$ | 0.6 |
| Ti tetra n-butoxide | 0.2 |
| Pentadiene (100% cis) | 4.0 |

After 24 hours at 0° C., followed by coagulation in methanol and drying, 0.8 g. of polypentadiene, under infrared analysis showing a cis-1,4 unit content of 78%, are obtained. After the purification or enriching step, the cis-1,4 content of the product increases to 87%.

Examples 9 to 13

The polymerizations are carried out as in Example 1, but instead of aluminum triethyl, equimolecular amounts of each of the following aluminum alkyls are used: aluminum trihexyl, aluminum trimethyl, aluminum tridodecyl, aluminum tricyclohexyl and aluminum diethylmonobenzyl.

Polypentadiene having a prevailingly cis-1,4 enchainment (about 70% in the crude polymer and about 85% after purification) and the isotactic structure, which is crystalline at room temperature is obtained in each case.

Examples 14 to 16

The polymerization is carried out as in Example 1, but instead of titanium tetrabutoxide, equimolecular amounts of each of the following compounds are used: titanium tetrabenzoxide, titanium tetraphenoxide and titanium tetraethoxide. The polymers produced in each case are practically identical with those of Example 1.

Example 17

100 parts by weight of cis-1,4 polypentadiene exhibiting the isotactic structure containing 75% of cis-1,4 units, which is obtained according to the preceding examples, are mixed in a roll mixer with the following ingredients:

| | Parts by weight |
|---|---|
| Phenyl β-naphthylamine | 1 |
| Laurinic acid | 2 |
| Zinc oxide | 5 |
| Vulcafor HBS [1] | 1.8 |
| Sulfasan R [2] | 2.2 |

[1] Cyclohexylbenzothiazyl sulphonamide, product of ICI.
[2] Morpholine disulphide, product of Monsanto Chem. Co.

The mix thus obtained is vulcanized in a press at the temperature of 150° C. for 40 minutes. The vulcanized product possesses the following characteristics:

| | | |
|---|---|---|
| Tensile strength | kg./cm.$^2$ | 190 |
| Elongation at break | percent | 1240 |
| Modulus at 300% | kg./cm.$^2$ | 13 |

Example 18

A 100-cc. glass test tube provided with a side tube for applying vacuum and introducing nitrogen is used as the polymerization reactor. Into this test tube, after the removal of air therefrom and introduction of anhydrous $N_2$, the following substances are introduced in the following order:

| | Cc. |
|---|---|
| Anhydrous benzene | 80 |
| Titanium tetraisopropoxide | 0.3 |
| Aluminum diethyl monohydride | 0.5 |

The temperature is brought to 0° C. and 15 cc. of 1,3-pentadiene (98% of trans isomer, 2% of cis isomer) are added to the homogenized mixture. The monomer is added 2 to 4 minutes after the formation of the catalyst. The whole mass is kept at 0° C. for 18 hours and the polymerization is then stopped by addition of methanol. The polymer is coagulated by addition of an excess of methanol and is dried under vacuum.

2.8 g. of a solid crystalline polymer are thus obtained which under infrared analysis appears to consist of:

66% of double bonds of cis type
10% of double bonds of vinyl type
24% of double bonds of trans type The polymer is dissolved in benzene, reprecipitated with methyl ethyl ketone and subjected again to infrared analysis with the following results:

| | Percent |
|---|---|
| Double bonds of cis type | 72 |
| Double bonds of trans type | 20 |
| Double bonds of vinyl type | 8 |

After a further purification by dissolution in benzene and reprecipitation with methylethyl ketone, the polymer exhibits the following characteristics:

(a) Infrared analysis:

84% of double bonds of cis type
11% of double bonds of trans type
5% of double bonds of vinyl type (b) The polymer is shown to be crystalline under X-ray examination at room temperature;
(c) Intrinsic viscosity (determined in toluene at 30° C.) $[\eta]=-5$ (100 cc./g.);
(d) Melting temperature (under the polarizing microscope)=40° C.

Example 19

The polymerization is carried out as in Example 18, but by operating at +20° C. instead of at 0° C.

After 5 hours, 3.2 g. of a solid crystalline polymer possessing the isotactic structure are obtained which polymer under infrared analysis is shown to consist of:

61% of cis double bonds
27% of trans double bonds
12% of vinyl double bonds

After purification by means of two dissolutions and reprecipitations with methyl ethylketone as described in Example 1, the polymer shows a cis-1,4 unit content of about 83% and is demonstrated to be crystalline under X-ray examination.

Example 20

The polymerization is carried out substantially as in Example 18, but by using toluene instead of benzene and operating at −20° C. instead of 0° C.

After 50 hours, 2.2 g. of crystalline polymer having a cis-1,4 unit content of about 65% and the isotactic structure are obtained.

After the purification, a product having a cis-1,4 unit content of 84% is obtained.

Example 21

Operating as described in Example 18, the following reactants are used:

| | Cc. |
|---|---|
| Anhydrous benzene | 30 |
| Titanium tetra n-butoxide | 0.2 |
| Al($C_2H_5$)$_2$H | 0.35 |

The catalyst is aged at 20° C. for 5 minutes and 7 cc. of pentadiene (95% of trans isomer) are added.

After a polymerization at 0° C. for 24 hours and coagulation with methanol, a product having a cis-1,4 unit content of 64% and an intrinsic viscosity of 2.92 (100 cc./g.) (determined in toluene at 30° C.) is obtained.

After purification by dissolution in benzene and reprecipitation with methyl ethyl ketone, a product containing 82% of units with cis-1,4 enchainment and the isotactic structure, is obtained.

Example 22

Operating as in Example 18, the following reactants are used:

| | Cc. |
|---|---|
| Anhydrous benzene | 60 |
| Titanium tetra-n-butoxide | 0.1 |
| Al($C_2H_5$)$_2$H | 0.17 |

The catalyst is aged at 20° C. for 20 minutes and 10 cc. of pentadiene (95% of trans) are added.

After polymerization at 20° C. for 30 hours, and coagulation with methanol, 2.5 g. of polymer similar to that produced in Example 4, are obtained.

Example 23

By operating according to the procedure described in Example 18, the following ingredients are used:

| | Cc. |
|---|---|
| Anhydrous benzene | 80 |
| Aluminum triethyl | 0.25 |
| Aluminum diethyl monohydride | 0.25 |
| Ti tetra n-butoxide | 0.3 |
| Pentadiene (95% trans) | 7.0 |

The monomer is added 1–2 minutes after the formation of the catalyst.

After 25 hours of polymerization, at 20° C. and after coagulation with methanol, a product having a cis-1,4 unit content of 65% is obtained with a conversion of 60%. After purification by dissolution in benzene and reprecipitation with dimethyl ethylketone, a product containing the isotactic structure and 85% of cis-1,4 units is obtained.

Example 24

Operating as described in Example 18, the following substances are used:

| | Cc. |
|---|---|
| Anhydrous benzene | 80 |
| Al diisobutylmonohydride | 0.6 |
| Ti tetra n-butoxide | 0.2 |
| Pentadiene (98% trans) | 7.0 |

The polymerization is carried out at 20° C., and is stopped by adding methanol to the reaction after 30 hours. 2.8 g. of polypentadiene with a cis-1,4 unit content of 64% are obtained. After the purification or enriching steps, the cis-1,4 content increases to 87%. The intrinsic viscosity of the crude polymer is 2.4 (100 cc./g.) (determined in toluene at 30° C.).

*Example 25*

Using the pure cis isomer of pentadiene, the polymerization is carried out using the proportions and conditions described in Example 21.

After polymerization at 0° C. for 24 hours, 1.2 g. of polymer, which by infrared examination is shown to have a cis-1,4 unit content of 76% (85% after purification) are obtained.

*Examples 26 to 28*

The polymerization is carried out as in Example 18, but instead of titanium tetraisopropoxide, equimolecular amounts of each of the following compounds are used: titanium tetrabenzoxide, titanium tetraphenoxide and titanium tetraethoxide. The polymers obtained are in each case practically identical with those of Example 18.

Many variations and modifications can, of course, be practised without departing from the scope and spirit of the present invention.

Having thus described the present invention, what it is desired to secure and claim by Letters Patent is:

1. A process for preparing cis-1,4 unsubstituted polypentadienes in which essentially all the cis-1,4 units have an isotactic configuration and which show at the X-rays crystallinity due exclusively to isotactic structure which comprises homopolymerizing 1,3-pentadiene in the presence of a catalyst obtained from (a) a titanium compound having the general formula:

wherein R represents a member selected from the group consisting of alkyl, aryl, alkylaryl and cycloalkyl groups and (b) an organo aluminum compound having the formula:

wherein $R_2$ and $R_3$ each represents a member selected from the group consisting of alkyl, alkylaryl and cycloalkyl groups and $R_1$ represents a member selected from the group consisting of hydrogen atoms, alkyl, alkylaryl and cycloalkyl groups.

2. The process of claim 1, wherein titanium compound is selected from the group consisting of titanium tetra-n-butoxide, titanium tetraisopropoxide, titanium tetraphenolate and titanium tetraethoxide.

3. The process of claim 1, wherein the organic aluminum compound is selected from the group consisting of dimethyl aluminum monohydride, diethyl aluminum monohydride, diisopropyl aluminum monohydride, dibutyl aluminum monohydride, dihexyl aluminum monohydride, dioctyl aluminum monohydride, ethyl-isobutyl aluminum monohydride, ethyl-propyl aluminum monohydride, ethyl-hexyl aluminum monohydride, aluminum triethyl, trihexyl aluminum, triisobutyl aluminum, tridodecyl aluminum, tricyclohexyl aluminum and diethyl monobenzyl aluminum.

4. The process of claim 1, wherein the molar ratio of organic aluminum compound to titanium compound is between about 1 and 100.

5. The process of claim 1, wherein the molar ratio of organic aluminum compound to titanium compound is between about 3 and 15.

6. The process of claim 1, wherein the polymerization is carried out at a temperature between about −100° and +100° C.

7. The process of claim 1, wherein the polymerization is carried out at a temperature between about −50° and +50° C.

8. The process of claim 1, wherein the polymerization is carried out in the presence of a hydrocarbon solvent.

9. The process of claim 1, wherein the polymerization is carried out using liquid 1,3-pentadiene monomer as the solvent.

10. The process for enriching the cis-1,4 unit content of an unsubstituted polypentadiene obtained by the process of claim 1, which comprises treating the polypentadiene with a solvent to thereby separate the sterically less pure macromolecules therefrom due to the higher solubility of said macromolecules.

References Cited by the Examiner

UNITED STATES PATENTS

| | | | |
|---|---|---|---|
| 2,977,349 | 3/1961 | Brockway et al. | 260—94.3 |
| 3,137,683 | 6/1964 | Natta et al. | 260—94.3 |

FOREIGN PATENTS

| | | |
|---|---|---|
| 213,051 | 1/1961 | Austria. |
| 873,046 | 7/1961 | Great Britain. |

OTHER REFERENCES

The Vanderbilt Rubber Handbook, R. T. Vanderbilt Co., Inc., New York, 1958, pages 376–377, TS 1890 V3 1958.

Stavely et al., Ind. and Eng. Chem., vol. 48, No. 4, April 1956, pages 778–783.

Natta et al., (3) Rubber and Plastics Age, April 1961, pps. 402–409.

Natta et al., Jour. Poly. Sci., vol. 51, 1961, pages 463–474.

D'Ianni, Rubber Chem. & Tech., vol. 34, No. 1, April–June 1961, pages 361–377; pages 366, 368, 370 relied on.

JOSEPH L. SCHOFER, *Primary Examiner.*

E. J. SMITH, *Assistant Examiner.*